United States Patent
Klemmensen

(10) Patent No.: US 9,204,232 B2
(45) Date of Patent: Dec. 1, 2015

(54) METHOD OF IDENTIFYING A WIRELESS COMMUNICATION CHANNEL IN A SOUND SYSTEM

(75) Inventor: Bjarne Klemmensen, Smørum (DK)

(73) Assignee: OTICON A/S, Smorum (DK)

(*) Notice: Subject to any disclaimer, the term of this patent is extended or adjusted under 35 U.S.C. 154(b) by 725 days.

(21) Appl. No.: 13/477,770

(22) Filed: May 22, 2012

(65) Prior Publication Data

US 2012/0300958 A1    Nov. 29, 2012

Related U.S. Application Data

(60) Provisional application No. 61/488,809, filed on May 23, 2011.

(30) Foreign Application Priority Data

May 23, 2011 (EP) .................... 11167073

(51) Int. Cl.
| | |
|---|---|
| H04R 5/02 | (2006.01) |
| H04R 25/00 | (2006.01) |
| H04R 27/02 | (2006.01) |
| G09B 5/04 | (2006.01) |
| G09B 21/00 | (2006.01) |

(52) U.S. Cl.
CPC ........ *H04R 27/02* (2013.01); *G09B 5/04* (2013.01); *G09B 21/006* (2013.01); *H04R 25/43* (2013.01); *H04R 25/407* (2013.01); *H04R 25/552* (2013.01); *H04R 25/554* (2013.01); *H04R 25/558* (2013.01); *H04R 2225/51* (2013.01); *H04R 2225/61* (2013.01)

(58) Field of Classification Search
CPC .............. H04R 25/554; H04R 25/558; H04R 2225/55; H04R 2225/51; H04R 25/43; H04R 25/55; H04R 27/02; H04R 2225/41; H04R 2460/07; G09B 21/006; G09B 5/04
USPC ........................................ 381/311, 315, 331
See application file for complete search history.

(56) References Cited

U.S. PATENT DOCUMENTS

| | | | |
|---|---|---|---|
| 5,594,934 A | 1/1997 | Lu et al. | |
| 8,411,887 B2 * | 4/2013 | Iwakuni et al. | 381/315 |
| 2005/0100182 A1 | 5/2005 | Sykes et al. | |

(Continued)

FOREIGN PATENT DOCUMENTS

| | | |
|---|---|---|
| EP | 1 531 650 A2 | 5/2005 |
| WO | WO 2010/086462 A2 | 8/2010 |
| WO | WO 2010143393 A1 * | 12/2010 |

*Primary Examiner* — Duc Nguyen
*Assistant Examiner* — Kile Blair
(74) *Attorney, Agent, or Firm* — Birch, Stewart, Kolasch & Birch, LLP

(57) ABSTRACT

A method of identifies an appropriate wireless communication channel in an audio receiving device, that comprises 1) a wireless receiver receiving an audio signal on a particular transmission channel selected among a predefined number of possible transmission channels, and 2) a microphone for picking up a sound in the environment of the audio receiving device. The method comprises a) selecting a channel as the receiving channel among a predefined number of possible transmission channels; b) analyzing the received signal received and the signal picked up by the microphone; c) determining whether a predefined criterion concerning the degree of similarity of the received signal and the signal picked up by the microphone is fulfilled; d) KEEPING the channel as the receiving channel, if the predefined criterion is fulfilled; and e) CHANGING the receiving channel to another channel if the predefined criterion is NOT fulfilled.

22 Claims, 6 Drawing Sheets

(56) References Cited

U.S. PATENT DOCUMENTS

| | | |
|---|---|---|
| 2005/0201578 A1 | 9/2005 | Fischer |
| 2007/0195973 A1* | 8/2007 | Kaulberg ................. 381/94.3 |
| 2008/0009253 A1 | 1/2008 | Callias et al. |
| 2008/0036574 A1 | 2/2008 | Andersen |
| 2010/0104120 A1 | 4/2010 | Steinbuss |
| 2010/0136930 A1 | 6/2010 | Grafenberg et al. |

* cited by examiner

METHOD OF IDENTIFYING A WIRELESS COMMUNICATION CHANNEL IN A SOUND SYSTEM

CROSS REFERENCE TO RELATED APPLICATIONS

This nonprovisional application claims the benefit of U.S. Provisional Application No. 61/488,809 filed on May 23, 2011 and to patent application Ser. No. 11/167,073.3 filed in Europe, on May 23, 2011. The entire contents of all of the above applications is hereby incorporated by reference.

TECHNICAL FIELD

The present application relates to a sound system, e.g. a sound amplification system comprising wireless communication between various parts of the system. The disclosure relates specifically to an audio receiving device for receiving a wireless signal comprising audio, and to a method of identifying an appropriate wireless communication channel in an audio receiving device. The application furthermore relates to a listening device and to a sound system comprising an audio receiving device.

The application further relates to a data processing system comprising a processor and program code means for causing the processor to perform at least some of the steps of the method and to a computer readable medium storing the program code means.

The disclosure may e.g. be useful in applications comprising simultaneous acoustic propagation and wireless transmission of an audio signal to an audio receiving device, e.g. in a sound amplification system, e.g. classroom amplification systems, teleconferencing systems, public address systems, audio entertainment systems, e.g. radio-/TV-/video-systems, karaoke systems, etc.

BACKGROUND ART

The following account of the prior art relates to one of the areas of application of the present application, hearing aids.

In recent years, ear level Hearing Aid FM receivers with frequency synthesis for RF channel selection have been presented to the market place.

With integrated frequency synthesis in the FM receivers, simple effective robust ways for changing the receiving frequency channel were required. The current methods for changing the receiving channel are presented in the following.

Today there are basically two different methods
1. Pushbutton
2. Wireless

Some FM receivers like the Oticon R2 have a separate button, where the user with a push can either
Single-step between the channels; or
Automatically seek for the next channel with a signal.
This functionality is illustrated in FIG. 1.
One disadvantage of the above approach is that, it may be time consuming to find the appropriate channel.

Changing the receiving channel by utilizing a wireless connection to the receiver is presently done either
by means of a fixed programmer installed at the door of a room, e.g. the wall pilot from Phonak or the eZync from Oticon.
or by means of a handheld device, e.g. Inspiro from Phonak or T20/T21/WRP/T30/T31 from Oticon.

This functionality is illustrated in FIGS. 2a and 2b, respectively.

WO 2010/086462 A2 describes a method for operating a hearing device that is worn by a user, the method comprising the steps of receiving a transmission signal comprising an audio signal of a sound source, determining a distance between the sound source and the hearing device, and generating an output signal supplied to an output transducer of the hearing device by at least taking into account the audio signal of the transmission signal and the distance.

US 2010/0104120 A1 describes a hearing aid intended to be able to recognize acoustic situations more reliably, the hearing aid including a microphone device for picking-up a sound signal, a reception device for picking-up an electrical or electromagnetic signal and a classification device for determining an acoustic situation from the signals of the microphone device and the reception device. A signal processing device processes the signals of the microphone device and the reception device as a function of an output signal of the classification device. In particular, the signals of the microphone device and the reception device are made available separately to the classification device for recognizing the situation. Thus, the individual input signals, or the correlation thereof, can be used for recognizing the situation.

DISCLOSURE OF INVENTION

To avoid disadvantages of prior art solutions of using an extra device mounted by the door for controlling channel selection of a listening device or the manual process of changing the receiving channel of a listening device, either by means of a handheld device or by pressing a push button on the listening device, an Automatic Channel Finder algorithm is introduced in an audio receiving device of the present disclosure.

In teaching situations where FM (or otherwise modulated) assistive listening devices are utilised, the students receive the microphone signal as well as the FM signal simultaneously, i.e. the teacher's voice is received at the microphone as well as by the FM receiver of the listening device.

The Automatic Channel Finder algorithm operates as follows:

If there is no correlation between the signals coming into the microphone(s) and the signal delivered by the wireless receiver, the audio receiving device instructs the wireless receiver to search for the next channel with a signal (i.e. to search for an actively used channel). The instruction to the receiver may e.g. be implemented via a digital interface, e.g. I²C, SPI, or any other standardized or proprietor interface including appropriate control signal(s), e.g. implemented as an electric or a magnetic interface. Once an active channel has been found, the audio receiving device again checks for correlation between the microphone signal and the received wireless signal.

If correlation is detected, the channel is assumed to be found, and (preferably) no further check for correlation are performed as long as the channel is active. If no correlation is detected, the above procedure is repeated until the wanted channel is found (or no channel is found, when all available channels have unsuccessfully been considered). If no channel is found, a predefined scheme for repeating the channel search procedure may be implemented (and/or await a user-activation of the procedure and/or an activation request received from an external device).

An object of the present application is to provide an alternative scheme for identifying a receiving channel in an audio receiving device.

Objects of the application are achieved by the invention described in the accompanying claims and as described in the following.

A Method of Identifying an Appropriate Wireless Communication Channel:

An object of the application is achieved by a method of identifying an appropriate wireless communication channel in an audio receiving device, the audio receiving device comprising a wireless receiver for receiving an audio signal on a particular transmission channel selected among a predefined number of possible transmission channels, and a microphone for picking up a sound in the environment of the audio receiving device, and for converting the sound to an electric input signal.

The method comprises, selecting a channel as the receiving channel in the wireless receiver of the audio receiving device among said predefined number of possible transmission channels;

analyzing in the audio receiving device the signal received by the wireless receiver via the receiving channel and the signal picked up by the microphone;

determining in the audio receiving device whether a predefined criterion concerning the degree of similarity of the signal received by the wireless receiver and the signal picked up by the microphone is fulfilled;

KEEPING the channel as the receiving channel, if said predefined criterion is fulfilled (and the channel search procedure is terminated); and CHANGING the receiving channel to another channel selected among said predefined number of possible transmission channels, if said predefined criterion is NOT fulfilled.

An advantage of the method is that it provides a relatively simple scheme for selecting an appropriate communication channel. A further advantage is that it provides a channel selection scheme that is suitable for a unidirectional (e.g. broadcasting) communication link (where no return channel is available for negotiating an appropriate channel). An advantage of an embodiment is that it may utilize existing components (wireless receiver, microphone) of a listening system to provide channel selection.

The term a 'communication channel' is in the present context taken to include one or more time slots or one or more frequency ranges, wherein the information of interest (e.g. an audio signal) is concentrated at a given point in time during a transmission from one point or node to the other, e.g. from a transmitter to a receiver.

The term 'a predefined criterion concerning the degree of similarity' of two signals may comprise any appropriate measure for verifying a certain degree of similarity between two signals (e.g. modulation index, wideband (average) level, average power spectrum density, etc.) and for which a logic criterion can be formulated and checked as to its fulfillment at a given point in time. In particular, the term may relate to the 'correlation' between the two signals, and particularly to whether or not the correlation is larger than a predefined value.

In an embodiment, the method comprises the wireless receiver generating an activity control signal indicative of whether the selected channel is active or not. The term 'active channel' is intended to mean a channel comprising a certain amount of power density (e.g. above a certain threshold), when monitored over a predefined time (e.g. of the order of ms or s). In an embodiment, the method comprises that in case the activity control signal indicates that the currently selected channel is not active, such fact is taken to indicate that the predefined criterion is NOT fulfilled and the receiving channel is subsequently changed to another channel selected among said predefined number of possible transmission channels.

In general, the method is aimed at being executed 'on demand', when an appropriate listening situation, presumably involving the simultaneous reception of a target signal as an acoustic sound signal and an electromagnetically received audio signal, is present. When such listening situation is not present, the method is not intended to be carried out on a regular basis. In an embodiment, the audio receiving device receives an environment control signal indicating the presence of such appropriate listening situation. Preferably, the method is executed during start-up of the audio receiving device (right after power has been switched on). Alternatively or additionally, the method is executed when the audio receiving device is brought into a specific mode of operation (e.g. when a specific program or combination of processing parameters is selected), either automatically (e.g. based on the environment control signal or a signal from a more general environment classification unit), and/or via a user interface (e.g. an activation element on the audio receiving device or a remote control device), and/or at the request of an external device, e.g. a broadcasting device located at a specific location (e.g. in a classroom or in an auditorium or in a TV-room, etc.) or from a multi-remote control (e.g. at the disposal of a teacher). In an embodiment, the method is executed when a currently used channel is no longer active, e.g. if the channel is suddenly interrupted. Such interruption may e.g. be detected by the wireless receiver and e.g. indicated by a change of the activity control signal.

A correlation between the signal received by the wireless receiver and the signal picked up by the microphone is in the present context taken to include, a mathematical correlation between electrical representations of the two signals (or signals derived therefrom). In an embodiment, the correlation is based on the calculation of a correlation coefficient, e.g. Pearson's correlation coefficient. Person's correlation coefficient $\rho_{xy}$ for two signals x and y is defined as the covariance cov(x,y) divided by the product of the individual standard deviations $\sigma_x$ og $\sigma_y$:

$$\rho_{xy} = \frac{cov(x,y)}{\sigma_x \cdot \sigma_y} = \frac{E[(x-\mu_x)\cdot(y-\mu_y)]}{\sigma_x \cdot \sigma_y}$$

where E is the expected value operator and $\mu_x$ is the mean value of x, and $\mu_y$ is the mean value of y. In the present context, the variables x and y are the representations (e.g. digital representations) of the wirelessly received signal and the signal picked up by the microphone, respectively, of the audio receiving device (e.g. a listening device). In an embodiment, correlation between the signal received by the receiver (e.g. x) and the signal picked up by the microphone (e.g. y) is taken to be present, if the absolute value of Person's correlation coefficient $|\rho_{xy}|$ is in the range from 0.3 to 1, such as in the range from 0.5 to 1, e.g. in the range from 0.7 to 1.

In an embodiment, a correlation measurement involves to determine whether a predefined criterion for the size of a correlation estimate is fulfilled. In an embodiment, a correlation measurement is performed over a predefined time, e.g. 20 s or less, e.g. 10 s or less, e.g. 5 s or less, e.g. 1 s or less. In an embodiment, a number of subsequent correlation measurements $N_{meas}$ are performed (e.g. 5 or 3) before an estimate of the current correlation between the signals is decided on. In an embodiment, a correlation is assumed if at least one half or a majority of the subsequent correlation measurements $N_{meas}$ fulfil the predefined criterion. In an embodiment, a noise level of the surrounding environment is estimated (e.g. in the audio receiving device, e.g. a listening device). In an embodiment, (only) one correlation measurement is performed when the noise level is below a predefined threshold value. In an embodiment, more than one correlation measurement is performed when the noise level is above a predefined threshold value. In an embodiment, the number of correlation measurements is increased with increasing noise level (in steps). In an embodiment, a (target) signal to noise ratio is estimated in the audio receiving device. In an embodiment, the correlation measurement time and/or the number of correlation measurements performed before deciding on the current correlation between the wirelessly received signal and the signal picked up by the microphone is/are based on the (target) signal to noise ratio.

In a preferred embodiment, one or both of the mean values $\mu_x$ and $\mu_y$ of the signals x and y are equal to zero. In an embodiment, the mean values $\mu_x$ and $\mu_y$ of the signals x and y are averaged over a predefined time. In an embodiment, the mean values $\mu_x$ and $\mu_y$ of the signals x and y are averaged over a predefined number of time frames, e.g. over 1 to 10 time frames. In an embodiment, the mean values $\mu_x$ and $\mu_y$ of the signals x and y are continuously updated (running averages).

In an embodiment, computationally simpler methods of estimating a correlation between the two signals in question can be used, e.g. by operating only on parts of the signals in question, e.g. an envelope (e.g. as given by a Hilbert transform or a low pass filtering).

In an embodiment, the predefined criterion relates to an analysis of an envelope signal of the respective signals. Preferably, the 3 dB cut-off frequency of a low pass filter providing an envelope of a signal is larger than 20 Hz, e.g. in the range from 20 Hz to 100 Hz, e.g. around 50 Hz. In an embodiment, the predefined criterion relates to correlation of one or more of the distances in time between characteristics of the respective signals, such characteristics being e.g. a rising edge and/or a falling edge of the envelopes of the respective signals. Alternatively or additionally, the characteristics may relate to pulse widths of the two signal streams. In an embodiment, correlation is determined assuming a predefined maximum delay between the two signals. Preferably, the predefined maximum delay is adapted to the practical system in question, such delay being e.g. dependent on the transmission distance between the audio source (e.g. a wireless microphone) and the audio receiving device (e.g. a listening device), the inherent delays in the transceivers and associated processing blocks in the devices in question (microphone/transmitter unit and listening/receiver device, etc.).

In an embodiment, the method comprises determining a current distance between an audio source and the audio receiving device (e.g. via a positioning system, e.g. in that the audio receiving device receives information about the current position of the audio source, e.g. via (e.g. embedded in) the electromagnetically received audio signal). Other less accurate estimates of the distance may be used, e.g. involving received field strength of the electromagnetic signal and/or acoustic input level of the acoustically propagated signal as detected by the audio receiving device.

The processing delay and propagation delay of the wirelessly transmitted and acoustically propagated signal may vary according to the practical systems (analogue, digital, amount of processing, e.g. encoding/decoding, etc.) and to the distances between the acoustic source (and wireless transmitter) and the audio receiving device. The difference in total delay between a received—wirelessly propagated—and a received—acoustically propagated—signal may vary accordingly. In some applications, e.g. analogue systems, e.g. FM-systems, the wireless propagation and processing delay is relatively short (e.g. less than 10 ms, e.g. less than 7 ms). In some applications, e.g. digital systems, e.g. Bluetooth or DECT or ZigBee systems, the wireless propagation and processing delay is relatively long (e.g. more than 10 ms, e.g. more than 15 ms, e.g. more than 25 ms). For a given application, where the details concerning the transmission (frequency, analogue/digital, modulation, transmission range, etc.) and processing and details concerning the possible mutual distances between transmitter and receiver(s) are fixed, an estimate of the minimum and maximum delay differences between the reception of a wirelessly transmitted and an acoustically propagated version of the same audio signal can be estimated. In some cases, NO correction for delay differences is absolutely necessary, e.g. if the delay difference is less than 10 ms. In some cases a fixed delay between the two signals can be estimated and used in all listening scenarios. In still other cases, the current delay difference is estimated 'on demand' (e.g. via a user interface, e.g. a button, on the audio receiving device) or automatically (e.g. according to a predefined criterion, e.g. repeatedly) and compensated for in the determination of the degree of similarity (e.g. correlation) of the two signals in question.

In an embodiment, a delay between the two signals is varied between a predefined minimum value and a predefined maximum value, such variation being e.g. performed in steps during a calibration procedure and/or during a measurement cycle, e.g. so that a correlation estimate is made for each delay value, and a maximum correlation is determined among the measurements, such delay value being the appropriate one for the current conditions. In an embodiment, a delay value determined during a calibration procedure is used in subsequent measurements, e.g. until a reset has been activated or the audio receiving device has been powered off and on. In an embodiment, the calibration procedure for determining an optimal delay between the signal picked up by the microphone and the wirelessly received signal of the audio receiving device is a part of a power-on procedure.

In an embodiment, the predefined criterion relates to a voice detection of the respective signals. If, e.g. the signal picked up by the microphone contains a voice and the signal received by the wireless receiver does not, the predefined criterion is NOT fulfilled. If, e.g. the signal picked up by the microphone as well as the signal received by the wireless receiver contain a voice, the signals are further analyzed to detect a possible correlation between the two voice signals (e.g. based on characteristics of the envelopes of the signals as indicated above, e.g. based on a mathematical correlation between the envelopes).

In an embodiment, the correlation is determined in one or more particular sub-frequency ranges or bands of the total frequency range considered by the listening device. In an embodiment, the correlation is determined based on a comparison of the levels (e.g. the magnitude) of the signal in said sub-frequency ranges or bands.

In an embodiment, the channel selection procedure is performed according to a list of predefined possible transmission channels. In other words, (all of) the predefined number of possible transmission channels available as receiving channels in the audio receiving device are selected during the selection procedure so that each channel is selected once as a receiving channel, if no successful correlation is made during the channel selection procedure.

An Audio Receiving Device:

An audio receiving device comprising a wireless receiver for receiving an audio signal on a particular transmission channel selected among a predefined number of possible transmission channels, and a microphone for picking up a sound in the environment of the audio receiving device, and for converting the sound to an electric input signal is furthermore provided by the present application.

The audio receiving device further comprises a channel selection unit for selecting a receiving channel in the wireless receiver of the listening device among said predefined number of possible transmission channels;

an analyzing unit for analyzing the signal received by the wireless receiver and the signal picked up by the microphone, and for determining whether a predefined criterion concerning the degree of similarity of the two signals is fulfilled;

the audio receiving device being adapted to keeping the receiving channel, if the predefined criterion IS fulfilled; and to changing the receiving channel to another channel selected among said predefined number of possible transmission channels, if the predefined criterion is NOT fulfilled.

It is intended that the process features of the method described above, in the detailed description of 'mode(s) for carrying out the invention' and in the claims can be combined with the device, when appropriately substituted by corresponding structural features. Embodiments of the device have the same advantages as the corresponding method.

The audio receiving device is intended for use with an audio transmitting device for transmitting a wireless signal comprising an audio signal. The application of the audio receiving device is further intended for use in a scenario where an audio signal is simultaneously acoustically propagated and wirelessly transmitted to the audio receiving device.

In an embodiment, the wireless receiver comprises an activity control unit adapted to generate an activity control signal indicative of whether the selected channel is active or not. In an embodiment, the audio receiving device is adapted to change the receiving channel to another channel selected among said predefined number of possible transmission channels in case the activity control signal indicates that the currently selected channel is not active (such fact is taken to indicate that the predefined criterion is NOT fulfilled).

Preferably, the wireless reception (and transmission) is based on far-field electromagnetic fields (radiated fields). In an embodiment, the wireless reception (and transmission) is based on near-field communication (e.g. inductive coupling between two coils located within each other's near-field). In an embodiment, the reception (and transmission) is based on light communication, e.g. infrared (IR) light.

In an embodiment, the audio receiving device comprises an indicator for indicating when a receiving channel has been identified. In an embodiment, the indicator comprises a light issuing device, e.g. an LED (cf. e.g. US 2008/036574 A1).

In an embodiment, the wireless receiver of the audio receiving device comprises an antenna and receiver circuitry for wirelessly receiving a transmitted signal from an audio transmitting device (e.g. of a microphone unit). In an embodiment, the wireless receiver of the audio receiving device comprises demodulation circuitry for demodulating the transmitted signal from an audio transmitting device and for extracting the audio signal.

In an embodiment, the predefined number of possible transmission channels selectable as a receiving channel in the audio receiving device is larger than 1, such as in the range from 2 to 8, e.g. larger than 2, e.g. equal to 4, such as larger than 8, such as in the range from 8 to 16.

In an embodiment, the microphone of the audio receiving device is specifically adapted to the task of identifying a receiving channel (e.g. a directional microphone). In an embodiment, the microphone of the audio receiving device comprises a silicon- or MEMS-microphone.

In an embodiment, the wireless receiver is located in a radio part, constituting a separate physical unit that is detachably attachable to another part of the audio receiving device. In an embodiment, the radio part further comprises one or more of the microphone, the channel selection unit and the analyzing unit. In an embodiment, the radio part is adapted to select the appropriate channel for reception of the transmitted signal from the microphone unit independently of other parts of the audio receiving device.

In an embodiment, the audio receiving device comprises an electric or magnetic or infrared interface to another device, e.g. a wireless interface or an interface comprising a connector. In an embodiment, where the audio receiving device is a self-contained part for receiving a wireless signal and selecting an appropriate channel for the reception, the audio receiving device may comprise a DAI interface. In an embodiment, the audio receiving device comprises an electric interface to a listening device, and is adapted to be detachably attached to the listening device.

In an embodiment, the audio receiving device comprises a variable delay unit adapted to insert a delay in the relevant of the two signal paths corresponding to the signal picked up by the microphone and the wirelessly received signal to provide that the two signals are aligned in time (e.g. a delay corresponding to a maximum correlation between the two signals when the receiving channel of the wireless receiver is correctly selected).

In an embodiment, the audio receiving device comprises an environment classification unit for describing various acoustic environments (or listening situations) of a user in a number of classes.

In an embodiment, the audio receiving device (e.g. the environment classification unit) comprises a level detector (LD) for determining the input level of the electric microphone signal and provide a LEVEL parameter (e.g. a wide band level and/or a level in various frequency bands). The input level of the electric input signal picked up from the user's acoustic environment is a classifier of the environment. In an embodiment, the level detector is adapted to classify a current acoustic environment of the user according to the level of the input signal, e.g. in a number of steps, e.g. as a HIGH-LEVEL or LOW-LEVEL environment. Alternatively, more than two steps may be used to indicate the input level(s). Level detection in hearing aids is e.g. described in WO 03/081947 A1 or U.S. Pat. No. 5,144,675. In an embodiment, the audio receiving device comprises a level detector for determining the input level of the signal received by the wireless receiver on the (currently selected) receiving channel. In an embodiment, the audio receiving device is adapted to perform a correlation measurement only when the measured level on the receiving channel and/or the signal picked up by the microphone system is/are above a predefined threshold.

In a particular embodiment, the audio receiving device (e.g. the environment classification unit) comprises a voice detector (VD) for determining whether or not the electric input signal comprises a voice signal (at a given point in time). A voice signal is in the present context taken to include a speech signal from a human being. It may also include other forms of utterances generated by the human speech system (e.g. singing). Voice detection may be indicated at a wide band level and/or in various frequency bands. In an embodiment, the voice detector unit is adapted to classify a current acoustic environment of the user as a VOICE or NO-VOICE environment. This has the advantage that time segments of the electric input signal comprising human utterances (e.g. speech) in the user's environment can be identified, and thus separated from time segments only comprising other sound sources (e.g. artificially generated noise). In an embodiment, the voice detector is adapted to detect as a VOICE also the user's own voice. Alternatively, the voice detector is adapted to exclude a user's own voice from the detection of a VOICE. In an embodiment, a voice detector provides an output control signal that has one value (e.g. logic one), when a voice is detected, and another value (e.g. logic zero), when no voice is detected in the input signal to the voice detector. In an embodiment, the signal picked up by the microphone as well as the signal received by the wireless receiver are analyzed with a voice detector, and the result thereof (and possibly the location in time of the voice elements) is used to define whether or not a predefined criterion relating to the degree of similarity of the signals is fulfilled. In an embodiment, a correlation between the microphone signal and the wirelessly received signal of a given selected receiving channel is based on a correlation between the output control signals from the voice detectors for the two signals in question. In an embodiment, the audio receiving device is adapted to provide that a correlation measurement is only initiated, if a voice is detected in the signal picked up by the microphone. Alternatively, the audio receiving device may be adapted to identify a receiving channel based on a specific test signal issued by an audio source and transmitted by a corresponding audio transmitting device on the relevant transmission channel.

In an embodiment, the audio receiving device comprises a memory storing data defining the predefined number and characteristics of the possible transmission channels. In an embodiment, the audio receiving device (e.g. a listening device) is adapted to receive such data from a programming device or from a device arranged at a specific location, e.g. in a classroom or in an auditorium). In an embodiment, such data have been stored in the audio receiving device during a customization procedure, where the audio receiving device is customized to a particular use and/or to a particular user.

In an embodiment, the audio receiving device is adapted to provide that the channel selection procedure is performed systematically according to a list of predefined possible transmission channels, e.g. by selecting one channel after the other from the list according to a predefined scheme (e.g. the order of appearance on the list, e.g. either ascending or descending). In an embodiment, the audio receiving device is adapted to—after a power down and power up of the device—select the same receiving channel as before the power down. Alternatively, the audio receiving device is adapted to always select a predefined 'start channel' after a power up of the device.

A Listening Device:

In an aspect, a listening device comprising an audio receiving device as described above, in the detailed description of 'mode(s) for carrying out the invention' and in the claims is provided.

In an embodiment, the listening device is implemented as one physical unit.

In an embodiment, the listening device is implemented as two or more physical units. In an embodiment, antenna and receiver circuitry of the wireless receiver of the audio receiving device is located in one separate physical unit (a radio part). In an embodiment, the radio part is detachably attachable to another part of the listening device. In an embodiment, the radio part and the other part of the listening device are adapted to be electrically connected via an electrical interface, e.g. a digital interface, e.g. comprising electric connectors, e.g. of the plug and socket type. In an embodiment, the radio part is adapted to select the appropriate channel for reception of the transmitted signal from the microphone unit independently of other parts of the audio receiving device. In an embodiment, the radio part comprises or consists of the audio receiving device.

In an embodiment, the listening device comprises a (further) microphone system for performing the normal tasks of a microphone system of a listening device, to pick up sounds from the environment for being presented to a user after appropriate signal processing). In an embodiment, the listening device comprises a directional microphone system adapted to separate two or more acoustic sources in the local environment of the user wearing the listening device. In an embodiment, the directional system is adapted to detect (such as adaptively detect) from which direction a particular part of the microphone signal originates. This can be achieved in various different ways as described in the prior art. In an embodiment, such microphone system is separate from the microphone system used for identifying an appropriate receiving channel. Alternatively, the microphone system may be used for both purposes, possibly in different modes depending on the current purpose.

In an embodiment, the listening device is adapted to provide a frequency dependent gain to compensate for a hearing loss of a user. In an embodiment, the listening device comprises a signal processing unit for enhancing the input signals and providing a processed output signal.

In an embodiment, the listening device comprises an output transducer for converting an electric signal to a stimulus perceived by the user as an acoustic signal. In an embodiment, the output transducer comprises a number of electrodes of a cochlear implant or a vibrator of a bone conducting hearing device. In an embodiment, the output transducer comprises a receiver (speaker) for providing the stimulus as an acoustic signal to the user.

In an embodiment, listening device, e.g. the microphone system and/or the wireless receiver of the listening device (and/or other functional components) comprise(s) a filter bank for providing a time-frequency representation of an input signal. In an embodiment, the time-frequency representation comprises an array or map of corresponding complex or real values of the signal in question in a particular time and frequency range. In an embodiment, the filter bank comprises a number of band-pass filters for filtering a (time varying) input signal and providing a number of (time varying) output signals each comprising a distinct frequency range of the input signal. In an embodiment, the filter bank comprises a Fourier transformation unit for converting a time variant input signal to a (time variant) signal in the frequency domain. In an embodiment, the frequency range considered by the listening device from a minimum frequency $f_{min}$ to a maximum frequency $f_{max}$ comprises a part of the typical human audible frequency range from 20 Hz to 20 kHz, e.g. a part of the range from 20 Hz to 12 kHz. In an embodiment, the frequency range $f_{min}$-$f_{max}$ considered by the listening device is split into a number P of frequency bands, where P is e.g. larger than 2, such as larger than 8, such as larger than 50, such as larger than 100, at least some of which are processed individually.

In an embodiment, the signal of a forward path of the listening device (from the microphone or microphone system to an output transducer), comprising a signal processing unit for applying a frequency dependent gain to the electric input signal picked up by the microphone system of the listening device, is processed in a number of frequency bands. Alternatively, the signal of the forward path may be processed in the time domain (but optionally analyzed in the frequency domain, e.g. to determine (time varying) filter constants of a filter of the forward path).

In an embodiment, the listening device further comprises other relevant functionality for the application in question, e.g. adaptive feedback cancellation, compression, noise reduction, etc.

In an embodiment, a listening device comprises a hearing instrument, a headset, an ear phone, an active ear protection device, or a combination thereof.

A Sound System:

In an aspect, a sound system is furthermore provided, the sound system comprising
- an audio source device for providing (e.g. generating or picking up) an audio signal; and
- an audio transmitting device for generating a wireless signal comprising a representation of said audio signal and transmitting the wireless signal on a particular transmission channel among a predefined number of possible transmission channels, and
- an audio receiving device as described above, in the detailed description of 'mode(s) for carrying out the invention' and in the claims is provided.

The audio receiving and audio transmitting devices are adapted to provide that the predefined number of possible transmission channels which the audio receiving device is able to select as receiving channels comprise (at least some of, such as at least one of, e.g. more than two) the predefined number of possible transmission channels that the audio transmitting device is capable of using as transmitting channels. In other words, the audio transmitting and the audio receiving devices are adapted to be able to set up a link between them using one of the possible transmission channels which the audio receiving device is able to select as receiving channels. In an embodiment, the predefined number of possible transmission channels of the audio transmitting device is one. In an embodiment, the predefined number of possible transmission channels of the audio transmitting device is larger than one, such as larger than 2, such as larger than 8, such as in the range from 8 to 32.

In an embodiment, a particular transmission channel for the audio transmitting device is programmable. In an embodiment, a particular transmission channel for the audio transmitting device is selectable via a user interface, e.g. a button. In an embodiment, the audio transmitting device is adapted to automatically find and select an appropriate frequency channel in the present environment of the device.

In an embodiment, the audio receiving device form part of a listening device, e.g. a body-worn listening device, e.g. comprising a headphone, a headset, an ear protection device and/or a hearing instrument.

In an embodiment, the sound system comprises a microphone for picking up the audio signal from the audio source (e.g. a person speaking or singing, i.e. the microphone is the audio source device).

In an embodiment, the sound system comprises a loudspeaker for generating the audio signal (i.e. the loudspeaker is the audio source and the audio source device).

Preferably, the sound system is adapted to provide that the transmission principle (modulation/demodulation), transmission power, and the distance between the audio transmitting and the audio receiving devices are adapted to the particular application to provide a sufficient transmission and reception quality of the wirelessly transmitted signal. Preferably, the audio source or the audio source device (e.g. a loudspeaker or a person speaking into a microphone unit) and the audio receiving device (e.g. a listening device) are arranged to be within a predefined maximum distance of each other during use, allowing the audio signal to acoustically propagate to the audio receiving device and be picked up by the microphone of the audio receiving device (preferably with a (target) signal to noise ratio sufficiently large for the receiving device to extract the target signal).

In an embodiment, the sound system is adapted to provide a proper function of the channel selection algorithm, when the audio transmitting device and the audio receiving device are less than to 50 m from each other, such as less than 20 m from each other, such as less than 10 m from each other, such as less than 5 m from each other, such as less than 1.5 m from each other.

In an embodiment, the sound system (e.g. the audio source device) comprises a microphone unit, wherein the microphone unit (comprising a microphone) and the audio transmitting device are formed as one physical unit, where the two elements are operationally connected and integrated in the same housing. Alternatively, the microphone and the audio transmitting device may be implemented as two separate physical units, operationally connected via a cable or other connection allowing a microphone signal picked up by the microphone to be transferred to the audio transmitting device for wireless transmission to the audio receiving device. In an embodiment, the microphone unit is a commercially available wireless microphone.

In an embodiment, the audio transmitting device comprises encoding/modulation and transmitter/antenna circuitry to provide that the audio signal is transmitted based on a specific modulation scheme, e.g. an analogue modulation scheme, such as FM (frequency modulation) or AM (amplitude modulation) or PM (phase modulation), or a digital modulation scheme, e.g. digital amplitude modulation, such as ASK (amplitude shift keying), e.g. On-Off keying, or digital frequency or phase modulation, such as FSK (frequency shift keying), PSK (phase shift keying) or QAM (quadrature amplitude modulation). In an embodiment, where a given encoding/modulation scheme has been chosen for the audio transmitting device, the audio receiving device comprises corresponding antenna/receiver and decoding/demodulation circuitry.

In an embodiment, the sound system comprises a sound transmission system. In an embodiment, the sound system comprises a sound amplification system, e.g. a classroom amplification system, a teleconferencing system, a public address system, an audio (possibly an A/V) entertainment system, e.g. comprising a radio-/TV-/video-device or the like and/or a karaoke system, or a combination thereof.

In an embodiment, the sound system comprises a multitude of audio receiving devices, e.g. listening devices. In an embodiment, the sound system comprises a system comprising a radio and/or a TV and/or a 'recorded media' player with sound output in combination with a listening device, where the sound is transmitted wirelessly from the sound producing devices to the listening device(s) in addition to the acoustically propagated sound.

In an embodiment, a sound system comprises a multitude of listening devices as described above, in the detailed description of 'mode(s) for carrying out the invention' and in the claims. In an embodiment, the sound system comprises one or more sets of binaural listening device systems, e.g. binaural hearing aid systems, each binaural listening device system comprising first and second listening devices (e.g. hearing instruments) adapted for being located at or in left and right ears of a user. In a preferred embodiment, each listening device of the binaural system comprises transceiver circuitry allowing an interaural wireless link to be established whereby an exchange of signals between the two devices is enabled. In an embodiment, the two listening devices are adapted to allow the exchange of status and/or control signals, e.g. including a channel selection signal. In an embodiment, the two listening devices are, additionally or alternatively, adapted to allow the exchange of audio signals (or at least a part of the frequency range of the audio signals) between them. In an embodiment, the system is adapted to provide that the channel selection procedure is performed (only) in one of the two listening devices of a binaural system. In an embodiment, the binaural system is adapted to provide that a control signal (channel selection signal) for indicating a transmission channel identified in a listening device of the binaural system is transmitted to the other listening device of the system via the interaural wireless link. In an embodiment, the system is adapted to provide that the channel selection procedure is performed in both listening devices of a binaural system. In an embodiment, the system is adapted to provide that a channel is selected in a given listening device only if the same channel is identified as the correct channel in the other (contralateral) listening device of a binaural system. In an embodiment, the system is adapted to provide that the channel selection procedure is performed according to a list of predefined possible transmission channels. In an embodiment, the system is adapted to provide that the channel selection procedure is performed in the two listening devices of a binaural system according to a list of predefined possible transmission channels, so that the two listening devices start from opposite ends of the list. Preferably, the first listening device to identify a correct (active) channel having a signal correlating with the microphone signal of the device selects this channel as a receiving channel, and transmits a control signal (channel selection signal) to the other listening device of the system, thereby selecting this channel as a receiving channel in the other listening device as well, and further terminating the search for an appropriate transmission signal in that device. This has the advantage of speeding up the search for an appropriate (receiving) channel.

Preferably, the interaural wireless link is based on near-field communication (e.g. inductive coupling between two coils located within each other's near-field). Alternatively, the interaural wireless link is based on far-field electromagnetic fields (radiated fields). In an embodiment, the interaural wireless link is independent of the wireless link from the microphone unit to the listening devices. Alternatively, the same link can be used to receive an audio signal from the microphone unit AND to communicate with the contralateral listening device.

A Computer-Readable Medium:

A tangible computer-readable medium storing a computer program comprising program code means for causing a data processing system to perform at least some (such as a majority or all) of the steps of the method described above, in the detailed description of 'mode(s) for carrying out the invention' and in the claims, when said computer program is executed on the data processing system is furthermore provided by the present application. In addition to being stored on a tangible medium such as diskettes, CD-ROM-, DVD-, or hard disk media, or any other machine readable medium, the computer program can also be transmitted via a transmission medium such as a wired or wireless link or a network, e.g. the Internet, and loaded into a data processing system for being executed at a location different from that of the tangible medium.

A Data Processing System:

A data processing system comprising a processor and program code means for causing the processor to perform at least some (such as a majority or all) of the steps of the method described above, in the detailed description of 'mode(s) for carrying out the invention' and in the claims is furthermore provided by the present application.

Further objects of the application are achieved by the embodiments defined in the dependent claims and in the detailed description of the invention.

As used herein, the singular forms "a," "an," and "the" are intended to include the plural forms as well (i.e. to have the meaning "at least one"), unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will also be understood that when an element is referred to as being "connected" or "coupled" to another element, it can be directly connected or coupled to the other element or intervening elements may be present, unless expressly stated otherwise. Furthermore, "connected" or "coupled" as used herein may include wirelessly connected or coupled. As used herein, the term "and/or" includes any and all combinations of one or more of the associated listed items. The steps of any method disclosed herein do not have to be performed in the exact order disclosed, unless expressly stated otherwise.

BRIEF DESCRIPTION OF DRAWINGS

The disclosure will be explained more fully below in connection with a preferred embodiment and with reference to the drawings in which.

The figures are schematic and simplified for clarity, and they just show details which are essential to the understanding of the disclosure, while other details are left out. Throughout, the same reference signs are used for identical or corresponding parts.

Further scope of applicability of the present disclosure will become apparent from the detailed description given hereinafter. However, it should be understood that the detailed description and specific examples, while indicating preferred embodiments of the disclosure, are given by way of illustration only. Other embodiments may become apparent to those skilled in the art from the following detailed description.

MODE(S) FOR CARRYING OUT THE INVENTION

Figure 1:
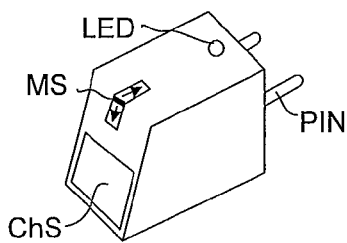
FIG. 1 shows a sketch of a prior art wireless FM receiver device, here similar to the Oticon R2, comprising push button control of communication channel.

FIG. 1 shows a sketch of a prior art wireless FM receiver device, here similar to the Oticon R2, comprising push button control of the communication channel. The device in FIG. 1 represents in the framework of the present application a radio part. In practice, the part is often also termed an 'FM-shoe' or an 'FM-pin', referring to the fact that the device comprises a wireless receiver adapted for reception of an FM-signal and that it is electrically connectable to another hearing aid part via an electric connector (cf. PIN in FIG. 1), the other part typically comprising the normal functions of a hearing aid (input and output transducers and signal processing, etc.). The device in FIG. 1 comprises a three-position switch (MS) for selecting an appropriate mode of the device, a push button (ChS) for selecting another channel, and a light indicator (LED).

Figure 2A:
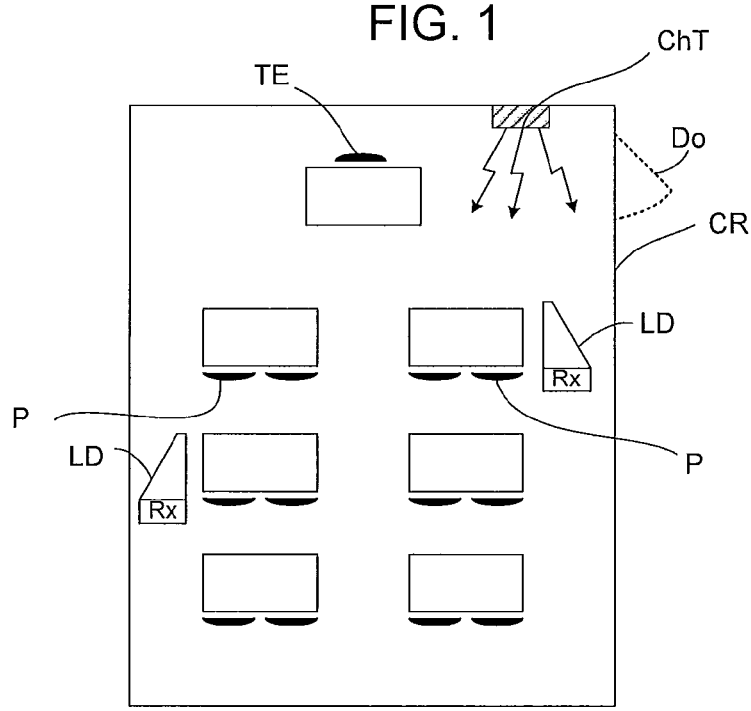
FIG. 2 shows a prior art scheme for communication channel control in listening devices using a wall mounted transmitter (FIG. 2a), and a manual programming procedure for a listening device (FIG. 2b)
Figure 2B:
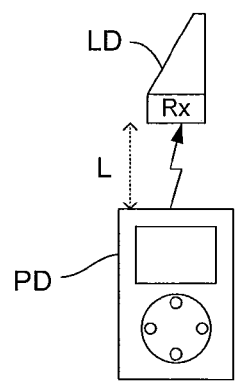

FIG. 2 shows a prior art scheme for communication channel control in listening devices using a wall-mounted transmitter (FIG. 2a), and a manual programming procedure for a listening device (FIG. 2b). FIG. 2a schematically illustrates an application of a sound amplification system in a classroom (CR) with a number (here 6) of tables in two rows, where students (P) are located two and two at each table and where a teacher (TE) is located at a table at one end of the room facing the students. The teacher is typically equipped with a microphone unit comprising a transmitter, and one or more (or all) of the students are equipped with one or two listening devices (LD) adapted for receiving the signal from the microphone via a wireless link between them. A channel selection unit (ChT) is indicated to be located on the wall (e.g. at the entrance to the classroom (cf. Do in FIG. 2a), possibly more than one unit is located at different locations), whereby the listening devices can be programmed to receive the signal from the teacher's microphone on an appropriate receiving channel. FIG. 2b shows a programming situation, where a listening device (LD) is (wirelessly, e.g. via an inductive link) programmed to provide that its wireless receiver (Rx) selects a receiving channel defined by or via a programming device (PD).

Figure 3:
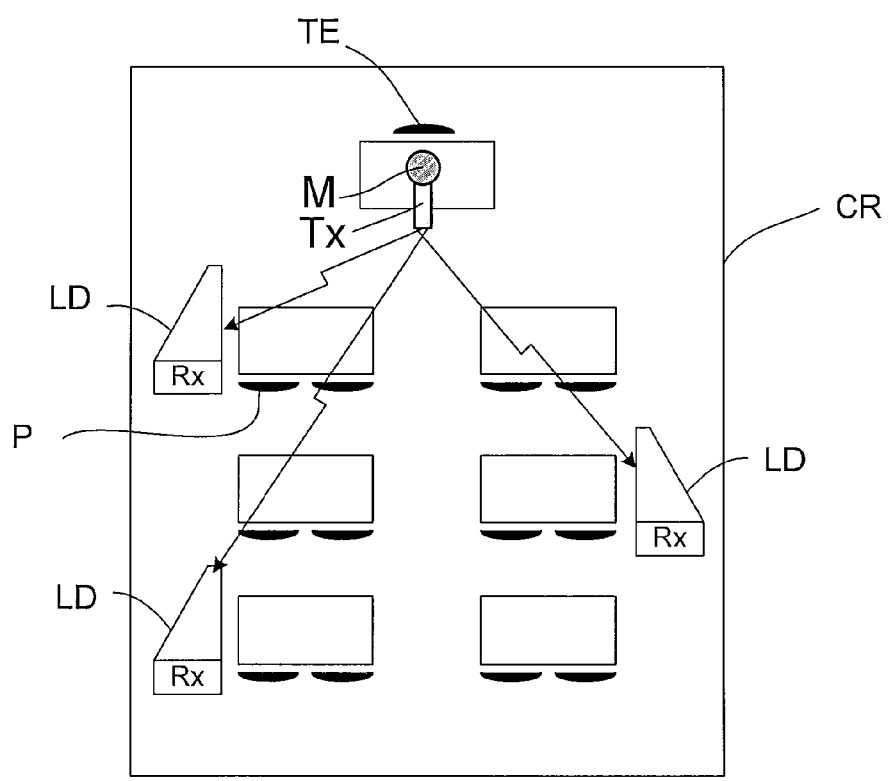
FIG. 3 shows a teaching scenario where the selection of a communication channel between a microphone of a teacher and listening devices of an audience is selected using correlation between the wirelessly received signal and the acoustically propagated signal in the receivers of the listening devices.

FIG. 3 shows a teaching scenario where the selection of a communication channel between a microphone (M) of a teacher (TE) and listening devices (LD) of an audience is selected using correlation between the wirelessly received signal and the acoustically propagated signal in the receivers (Rx) of the listening devices (LD). FIG. 3 shows a classroom (CR), wherein a teacher (TE) equipped with a wireless microphone unit (M, Tx) and a number of students (P) located at tables and some of the students are equipped with a listening device (LD), e.g. a hearing instrument. Each listening device (LD) is assumed to include a radio part (Rx) comprising an audio receiving device, including a channel selection algorithm, allowing the identification in the listening device of the channel used by the transmitter (Tx) of the microphone unit (M) of the teacher (TE). Thereby channel selection units (cf. ChT in FIG. 2a) can be dispensed with. Of course the two principles may be combined, so that some listening devices of a room receive the appropriate channel from a (e.g. wall-mounted) channel selection device (or is programmed by a separate device, or uses a select or scan button on the listening device, etc.), whereas other listening devices comprise functional elements implementing the channel selection algorithm of the present disclosure.

Figure 4A:
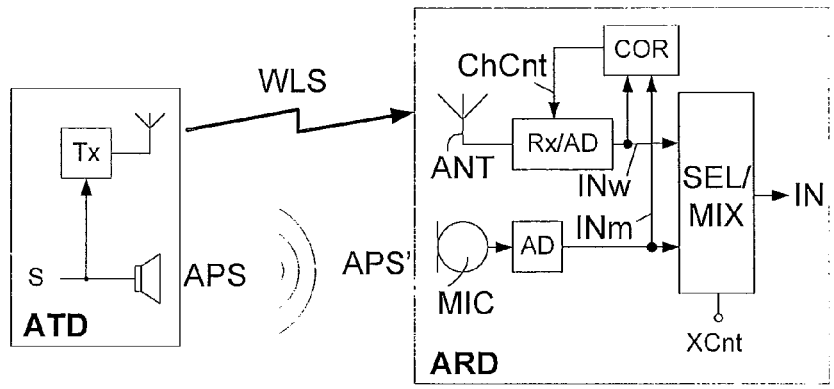
FIG. 4 shows two embodiments of a sound system according to the present disclosure.
Figure 4B:
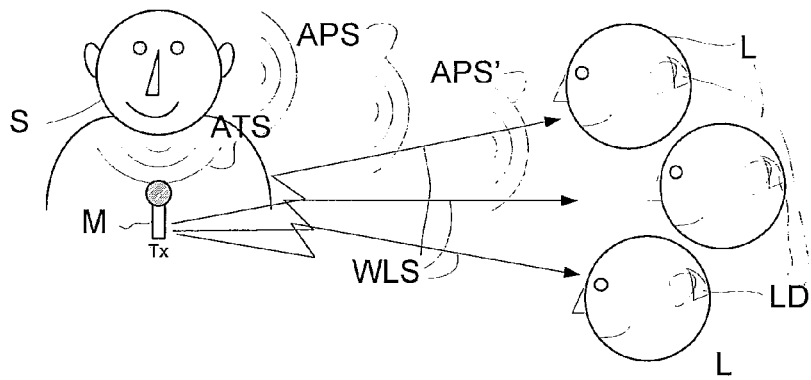

FIG. 4 shows two embodiments of a sound system according to the present disclosure. FIG. 4a shows a sound system according to an embodiment of the present disclosure. The sound system comprises an audio source (audio signal S propagated through the speaker and providing sound signal APS), an audio transmitting device (ATD) and at least one audio receiving device (ARD). The sound system of FIG. 4b can e.g. form part of an entertainment system, e.g. comprising a TV with a speaker output and a transmitter for wirelessly transmitting the TV-sound to a listening device (ARD), e.g. a hearing instrument. The audio transmitting device comprises transmitter (Tx) and antenna circuitry for modulating or coding the audio signal S and transmitting the resulting wireless signal WLS to the receiving device ARD, where it is received by antenna ANT and demodulated or decoded and digitized in the wireless receiver (Rx/AD block), resulting in digitized wirelessly received input audio signal INw. The speaker of the audio transmitting device provides the sound signal APS, which is propagated and coloured by the environment (e.g. a room) and arriving at the receiving device ARD in modified form (signal APS'), where it is picked up by microphone MIC and digitized in AD converter (AD) providing digitized microphone input signal INm. The input signals INw and INm are fed to the analyzing unit COR where a measure of the correlation between the two input signals is determined resulting in control signal ChCnt for controlling whether to keep or change the receiving channel of the wireless receiver Rx. The input signals INw and INm are additionally fed to the mixer/selection unit SEL/MIX, where one of the signals (or a mixture of the two) are provided as an output in the form of resulting input signal IN. The resulting input signal IN, which (after a successful receiver channel selection procedure) represents the wirelessly received (and acoustically propagated) audio signal, may be fed to an output transducer or to a signal processing unit for further processing. The SEL/MIX unit is controlled by control signal XCnt. In an embodiment, the mixer/selection unit is omitted and the wirelessly received signal is used as resulting input signal IN. The electric signal IN may be forwarded to another part of a listening device directly or via a standardized interface (e.g. a wired or wireless interface). The embodiment of an audio receiving device ARD shown in FIG. 4a may form a radio part with an electric interface to other parts of a listening device or be directly integrated with such parts (as e.g. shown in FIG. 5).

FIG. 4b shows a sound system used to broadcast one person's (a speaker S) voice to a number (here 3) of listeners L. The speaker wears a microphone unit M comprising a transmitter Tx for transmitting a signal comprising the speaker's voice to the receivers of the listening devices LD worn by the listeners. The signal picked up by the microphone unit M is indicated by ATS (Acoustic Target Signal), the wirelessly transmitted signal comprising a representation of ATS is indicated by WLS (WireLess Signal). The acoustically propagated signal representing the speaker's voice is indicated by APS. The acoustically propagated signal APS arrives at the listening devices LD of the listeners in an attenuated form (and otherwise distorted by the room transfer function) indicated by APS'. This signal is picked up by a microphone system of each listening device and converted to an electric signal that is analyzed in each listening device together with the wirelessly received counterpart to find a correlation between the two signals (cf. FIG. 5). The receiving channel is changed in the listening device (according to a scheme thereby scanning through a list of possible receiving channels) until a predefined criterion regarding the similarity of the acoustically propagated and received and the wirelessly transmitted and received signal is fulfilled, in which case a proper receiving channel has been identified (and is kept) in the receiver of the listening device. In case that NO appropriate receiving channel can be identified after having scanned through the possible receiving channels, the procedure may be repeated a predefined number of times before being terminated. The channel search procedure may then be reactivated by any appropriate means, e.g. a predefined event or action, e.g. by a user initiated input or by an external input or in connection with a power-on procedure.

Figure 5:
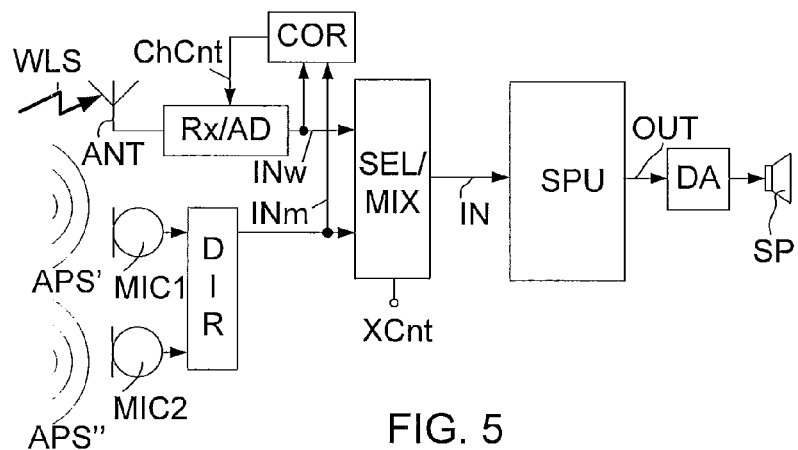
FIG. 5 shows a listening device of a sound amplification system.

FIG. 5 shows a listening device of a sound amplification system. The listening device (e.g. LD in FIG. 4b) receives acoustically propagated versions APS', APS" of a speakers voice as well as a wirelessly transmitted signal WLS comprising the speaker's voice (see e.g. scenario of FIG. 4b). The sound signal (comprising the acoustically propagated signals APS', APS" as well as other acoustic signals in a user's environment) is picked up by a microphone system comprising first and second (e.g. omni-directional) microphones MIC1, MIC2 each converting a sound signal (APS', APS", respectively) to an analogue electric signal and a weighting unit (DIR) for appropriately digitizing and mixing the two signals to provide a resulting (directional) microphone signal INm. The digitized version INm of the resulting microphone signal is fed to selection or mixing unit (SEL/MIX) as well as to an analyzing unit COR. In parallel thereto, the wirelessly transmitted signal WLS is received and demodulated in the antenna (ANT) and receiver circuitry (Rx/AD), here also comprising an analogue to digital converter, to provide a digitized version of the wirelessly received audio signal INw. The signal INw is fed to selection or mixing unit (SEL/MIX) as well as to analyzing unit COR. Alternatively, an omni-directional signal, e.g. a signal from one of the microphones MIC1, MIC2 (appropriately digitized) may be fed to the analyzing unit COR instead of the (directional) microphone signal INm. The selection or mixing unit (SEL/MIX) is adapted to select one of the input signals or to mix the input signals to a selected or mixed output signal IN from the SEL/MIX unit. The function of the selection or mixing unit is controlled by control signal XCnt. In the present embodiment, the processing of the selected or mixed input signal IN of the forward path of the listening device is performed in the time domain. The forward path comprises a signal processing unit SPU receiving the selected or mixed input signal IN. The signal processing unit SPU is adapted for enhancing the input signal, e.g. simply to apply a frequency independent gain to amplify the signal and provide a processed signal OUT (alternatively a frequency dependent gain, e.g. according to a particular user's needs in a given situation of use of the listening device, may be implemented by the SPU). The signal processing unit SPU may further be adapted to run various algorithms for enhancing the signal, e.g. noise reduction, anti-feedback, etc. Alternatively to processing in the time domain, the signal processing may be performed independently in a number of frequency bands based on input signals $IFB_1$, $IFB_2$, ..., $IFB_{NI}$, from which the signal processing unit SPU provides corresponding processed output signals $OB_1$, $OFB_2$, ..., $OFB_{NO}$. The processed signals $OFB_1$, $OFB_2$, ..., $OFB_{NO}$ are then fed to an output unit, comprising a time-frequency to time conversion unit, e.g. a synthesis filter bank, providing the output signal OUT in the time domain. The listening device may further (as shown here) comprise a digital to analogue converter DA for converting the output signal OUT from the signal processing unit SPU to an analogue signal and an output transducer, here in the form of a speaker SP for converting the analogue output signal from the DA-converter DA to an acoustic sound for being presented to a user of the listening device. Such device may implement a hearing instrument or an amplifying ear piece (e.g. for use in an public address system, e.g. a classroom amplification system, e.g. for the treatment of auditory processing disorder APD).

The analyzing unit COR analyzes the two digitized input signals INw and INm and estimates a degree of similarity between the two signals and determines whether or not a predefined criterion is fulfilled. Based thereon a channel control signal ChCnt is generated and fed to the receiver (here Rx/AD) of the listening device. If the criterion is fulfilled the current receiving channel is maintained. If not, another predefined possible channel is selected in the receiver aiming at receiving the wireless signal WLS from the transmitter of the microphone unit. In an embodiment, a list defining the possible channels is stored in a memory of the listening device. When another receiving channel is to be selected and checked for its correlation with the microphone signal INm, a candidate channel is selected from the stored list according to a predefined procedure, e.g. order of appearance on the list, randomly chosen from the list, according to a scheme previously experienced by the listening device in question (such scheme being stored in the memory), etc.

Figure 6:
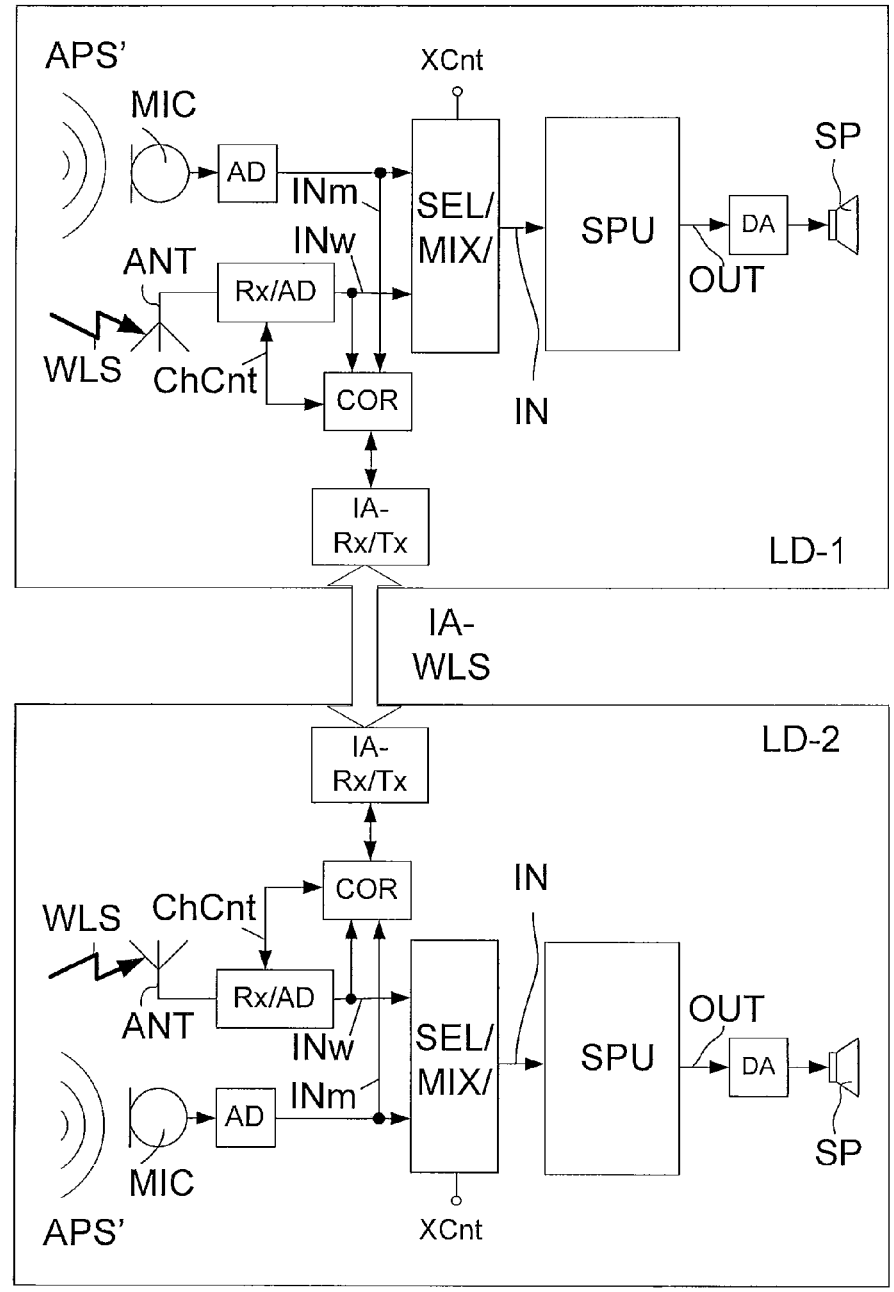
FIG. 6 shows a binaural listening device system.

FIG. 6 shows a binaural listening device system. The binaural listening system of FIG. 6 forms part of a sound amplification system, e.g. similar to the one illustrated in FIG. 4. The two listening devices LD-1 and LD-2 of the sound amplification system may be essentially identical (e.g. a left and right hearing instrument of a binaural hearing aid system). The two listening devices LD-1 and LD-2 comprise the same elements as shown in and discussed in connection with FIG. 5. In the embodiment of the listening devices LD-1 and LD-2 of FIG. 6, the output (IN) of the selection and/or mixer unit (SEL/MIX) is a time domain signal that is fed the signal processing unit (SPU) and whose time domain output (OUT) is connected to the digital to analogue converter (DA) before being presented to a user via speaker (SP). Alternatively, the listening devices of the binaural system of FIG. 6 may process the signal of the forward path in the frequency domain. Further, the listening devices LD-1 and LD-2 each comprise transceiver circuitry IA-Rx/Tx for establishing a (interaural, IA) wireless link IA-WLS between the two listening devices, whereby an exchange of control and/or status and/or audio signals can be performed. The transceivers are e.g. adapted to receive a receiver channel control signal ChCnt from the analysing unit COR of one listening device (e.g. LD-1) and to transfer it to the analysing unit of the other listening device (e.g. LD-2) via the interaural wireless link and the transceiver of the other listening device (LD-2). Thereby a useable receiver channel identified in one listening device can be transferred and implemented in the other listening device (to thereby provide a faster identification process). In an embodiment, the identification process is only performed in one of the listening devices and the resulting channel control signal is transferred to the other listening device and the same receiving channel is thereby selected in the two devices. In the latter embodiment, one of the devices can be simpler (the analyzing unit can be omitted or powered down) and power can be saved in that device. In an embodiment, a number of the last used transmission channels are stored in the listening device. In an embodiment, the last used transmission channels are selected first and tried out to determine the correlation with the signal picked up by the microphone, when the search procedure is initiated. In an embodiment, the system is adapted to provide that the channel selection procedure is performed in both listening devices of the binaural system. In an embodiment, the system is adapted to provide that the channel selection procedure is performed according to a list of predefined possible transmission channels. In an embodiment, the system is adapted to provide that the channel selection procedure is performed in the two listening devices of a binaural system according to the list of predefined possible transmission channels, so that the two listening devices start from opposite ends of the list. Preferably, the first listening device to identify a correct (active) channel having a signal correlating with the microphone signal of the device selects this channel as a receiving channel, and transmits a control signal (channel selection signal, e.g. ChCnt of FIG. 6) to the other listening device of the system, thereby selecting this channel as a receiving channel in the other listening device as well, and further terminating the search for an appropriate transmission signal in that device.

Figure 7:
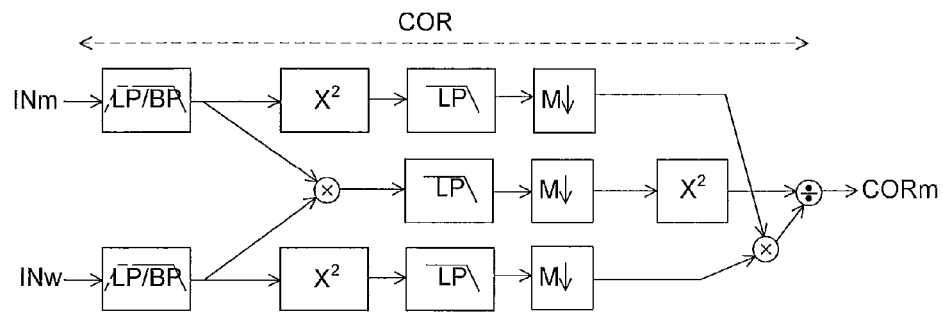
FIG. 7 shows an embodiment of a correlation detector.

FIG. 7 shows an embodiment of a correlation detector comprising three parallel signal paths, two identical primary signal paths (the upper and lower paths) and a secondary signal path (the middle path). Each signal path comprises processing units and provides an intermediate result. The intermediate results are combined to provide a measure of the correlation between the two current input signals INm and INw from the microphone and the wireless receiver, respectively. The correlation measure implemented by the circuit of FIG. 7 is (an estimate of) the correlation coefficient $\rho_{xy}$ (squared):

$$\rho_{xy}^2 = \frac{E^2[x \cdot y]}{\sigma_x^2 \cdot \sigma_y^2}$$

where x and y are the input signals from the microphone and the wireless receiver, respectively, E is the expected value operator, and $\sigma_x$ and $\sigma_y$ are the standard deviations of x and y, respectively. The mean values $\mu_x$ and $\mu_y$ of x and y, respectively, are assumed to be zero (cf. high-pass-filtering in preceding microphone unit or in band-pass filter (LP/BP) of FIG. 7). In an embodiment, correlation between the signals is assumed to be present, if the value of the correlation coefficient $\rho_{xy}^2$ is in the range from 0.1 to 1, such as in the range from 0.3 to 1, e.g. in the range from 0.5 to 1. The aim of the correlation detector COR is to enable the selection of the receiving channel: If there is little or no correlation between the signals, the wireless receiver is instructed to switch to another channel (according to a predefined scheme) and the correlation measurement is repeated. If correlation is above a predefined level, the channel is assumed to be found, and that channel is used as the receiving channel. In an embodiment, the wirelessly received signals for ALL possible channels are checked for their correlation with the microphone signal, and the channel with the largest correlation is selected as the receiving channel (if it fulfils the predefined criterion).

The correlation detection circuit COR of FIG. 7 comprises parallel signal paths for processing the microphone signal INm and the wirelessly received signal INw. Each signal path comprises a band-pass filter for filtering the input signal in question (or alternatively a low-pass filter, if the input signal has been subject to an appropriate high-pass filter a preceding processing step, e.g. in connection with AD-conversion), cf. LP/BP-blocks in FIG. 7. Each band-pass filtered input signal is fed to a magnitude squared block ($X^2$) whose output is low-pass filtered (in block LP) and down-sampled (in block M↓). The down-sampled signals provide the outputs of the respective primary signal paths. The (middle) secondary signal path comprises (from left to right) multiplication unit (x) combining the outputs of the band-pass filters of the respective primary signal paths. The multiplication unit provides a multiplied output that is fed to a low-pass filter (LP) whose output is fed to a down-sampling unit (M↓). The output of the down-sampling unit is fed to a magnitude squared block ($X^2$) whose output provides the output of the secondary signal path. The outputs of the primary signal paths are combined in multiplication unit (x) whose output is fed to an input of a dividing unit (÷). The other input of the dividing unit (÷) is the output of the secondary signal path (output of block $X^2$). The output of the dividing unit (÷) provides the resulting correlation measure CORm. The present embodiment of a correlation detector is only intended to provide an example of an implementation of the mentioned correlation measure. Other implementations may be envisioned and other correlation or similarity measures may be used.

Figure 8:
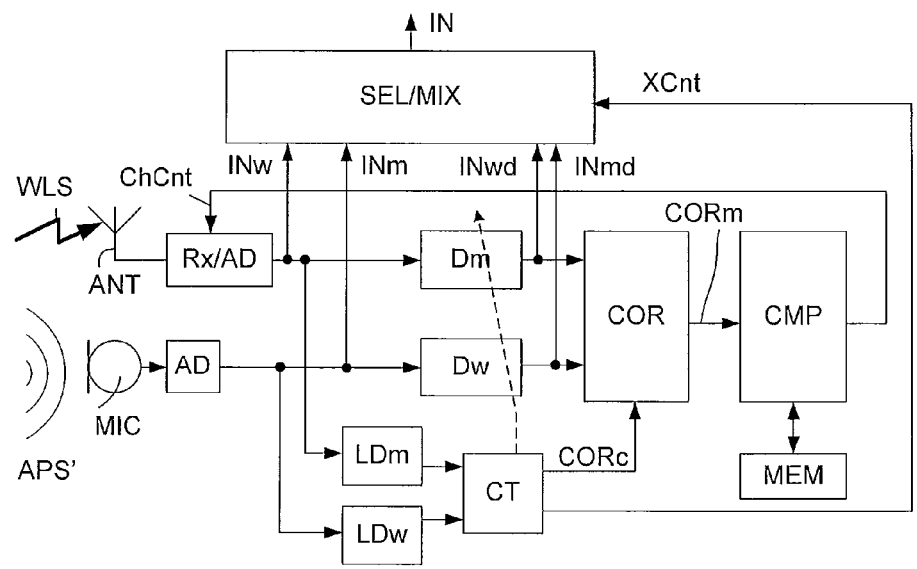
FIG. 8 shows an embodiment of an audio receiving device.

FIG. 8 shows an embodiment of an audio receiving device. The audio receiving device of FIG. 8 comprises the same elements as the audio receiving device (ARD) of FIG. 4a as discussed in relation herewith. The audio receiving device thus comprises units (MIC, AD) for picking up an audio signal (APS') and units (ANT, Rx/AD) for receiving a wireless signal (WLS) comprising an audio signal and for determining an appropriate receiving channel (COR) and for selecting (or mixing) a resulting input signal (SEL/MIX) between the two input signal. The SEL/MIX unit is controlled by control signal XCnt. The audio receiving device of FIG. 8 further comprises a variable delay unit (Dm, Dw) for inserting a delay in the relevant of the two signal paths corresponding to the signal INm picked up by the microphone and the wirelessly received signal INw to provide that the two signals are aligned in time, providing aligned signals INmd and INwd, respectively. The variable delay unit is controlled by control unit CT. Control unit CT receives inputs from level detectors LDm and LDw, which provide estimates of the current level of input signals INm and INw, respectively. The control unit further controls the correlation detection unit COR via control signal CORc, e.g. details of the correlation measurement (e.g. when to start a measurement, how long to measure, how many subsequent measurements, etc.). Other inputs than signal levels (e.g. a modulation index) may alternatively or additionally be used to influence the delay setting and/or the correlation measurement. The control unit CNT may further be adapted to control the selection or mixing unit SEL/MIX via control signal XCnt. The correlation unit COR performs an estimate of the current correlation between (aligned) input signals INmd and INwd controlled by control signal CORc from the control unit CT. The correlation unit COR may e.g. be implemented as shown in FIG. 7. The signal CORm provides an estimate of the current correlation between the signal INm picked up by the microphone and the wirelessly received signal INw (or delayed and/or processed versions thereof). The current correlation estimate CORm is fed to a comparison and decision unit (CMP), where a comparison with a predefined criterion concerning the correlation is made and a decision as to keep or change the current receiving channel. The predefined criterion is e.g. stored in memory MEM which is accessible from the comparison and decision unit (CMP). This results in control signal ChCnt, which is fed to the receiver unit (Rx/AD) for controlling the selection of the currently used receiving channel of the wireless receiver (ANT, Rx/AD). The (aligned) input signals INmd and INwd are further fed to the selection or mixing unit SEL/MIX, and may be individually selected or mixed with one or more of the other input signals INm, INw (controlled by control signal XCnt) to provide the resulting input signal IN, which may be subject to further processing in other parts of the audio receiving device or in a listening device, which the audio receiving device may form part of. In an embodiment, the resulting signal IN provided by the SEL/MIX unit is the wirelessly received signal INw (or a signal originating therefrom, e.g. the delayed signal INwd).

Figure 9:
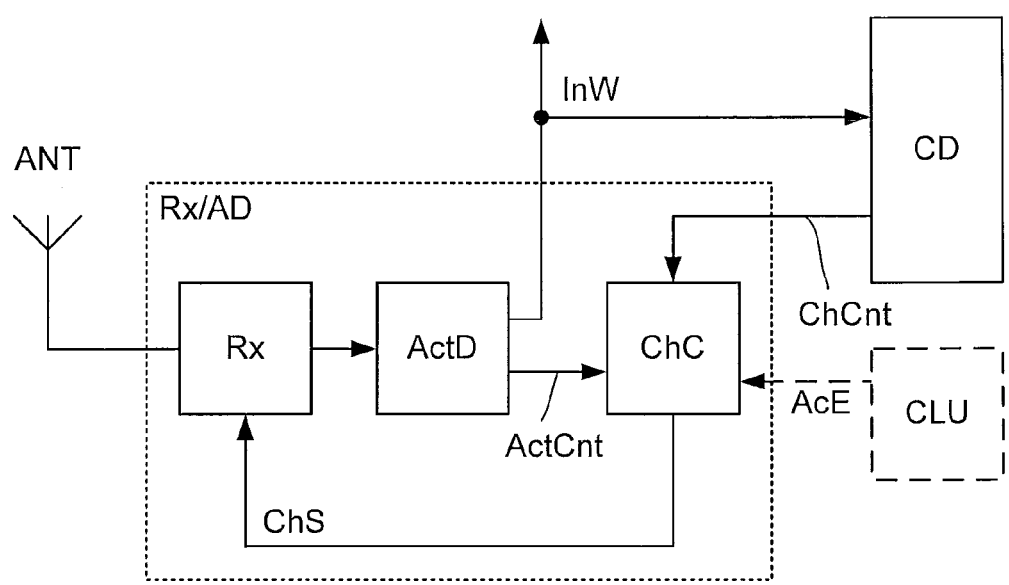
FIG. 9 shows an embodiment of a wireless receiver.

FIG. 9 shows an embodiment of a wireless receiver (ANT, Rx/AD), as e.g. used in the embodiment of an audio receiving device discussed in FIG. 8. The wireless receiver comprises antenna (ANT) for receiving the electromagnetic signal (comprising a target audio signal). The antenna is coupled to receiver unit (Rx) for amplifying and demodulating the signal from the antenna and providing a wirelessly received signal (representing a specific transmission channel) to an activity detector (ActD). The activity detector senses whether the channel is active (i.e. comprises a signal with a minimum of signal power density), and provides an activity control signal ActCnt to a channel control unit (ChC), and if an active channel has been detected provides the input signal INw to the correlation detector (CD) for estimating the degree of similarity between the wirelessly received signal INw and the acoustically received signal INm. (cf. e.g. FIG. 8, units Dm, Dw, COR, CMP). If the control signal ChCnt from the correlation detector (CD) indicates that the similarity between the two input signals is above a predefined level, the currently selected channel is kept (and the channel search procedure is terminated), and if not, the channel control unit (ChC)—via control signal ChS—requests the receiver unit (Rx) to change to the next channel selected among a predefined number of possible transmission channels (stored in the receiver unit (Rx)). If the control signal ActCnt indicates that no active channel has been identified, the channel control unit (ChC) requests the receiver unit (Rx) to change to the next predefined channel (such fact is taken to indicate that the predefined criterion is NOT fulfilled). In an embodiment, the audio receiving device comprises, or has access to, a number of detectors or sensors, e.g. indicating a property of a signal of the forward path of the audio receiving device and/or a property of the current acoustic environment of the audio receiving device. The outputs of the detectors are e.g. fed to the channel control unit (ChC) for contributing to the choice to receiving transmission channel (i.e. influencing control signal ChS, or e.g. as here via an environment classification unit (CLU) providing acoustic environment control signal AcE to the channel control unit (ChC) for describing various acoustic environments (or listening situations) of a user in a number of classes. Individual sensor signals (or the 'consolidated' acoustic environment control signal AcE) may e.g. be used to decide (or to influence such decision) whether the initiation (and/or termination) of a channel search procedure is to be performed at a given point in time. The wireless receiver (ANT, Rx/AD) comprises analogue to digital conversion units (AD) as appropriate for the embodiment in question.

The invention is defined by the features of the independent claim(s). Preferred embodiments are defined in the dependent claims. Any reference numerals in the claims are intended to be non-limiting for their scope.

Some preferred embodiments have been shown in the foregoing, but it should be stressed that the invention is not limited to these, but may be embodied in other ways within the subject-matter defined in the following claims.

The invention claimed is:

1. A method of identifying an appropriate wireless communication channel in an audio broadcasting system that includes an audio transmitter and a plurality of audio receiving devices, the audio transmitter including a microphone and a wireless transmitter for transmitting on an unknown radio channel among a predefined number of possible transmission channels an electric signal generated by the microphone in response to receiving an audio input signal, each of the audio receiving devices including a wireless receiver for receiving the electric signal on the unknown radio channel selected among the predefined number of possible transmission channels, and a microphone for picking up a sound in the environment of the audio receiving device, and for converting the sound to an electric input signal, wherein the method comprises:

receiving the audio input signal at the microphone of the audio transmitter and outputting the electric signal;

transmitting the electric signal by the wireless transmitter of the audio transmitter;

receiving the audio input signal or an audio signal derived from the audio input signal at the microphone of each audio receiving device;

selecting a channel as a candidate of the unknown radio channel in the wireless receiver of each audio receiving device among said predefined number of possible transmission channels;

receiving the electric signal at the wireless receiver of each audio receiving device using the selected channel;

analyzing in each audio receiving device the electric signal received by the wireless receiver via the selected channel and the signal picked up by the microphone of the audio receiving device;

determining in each audio receiving device whether a predefined criterion concerning a degree of similarity of the signal received by the wireless receiver and the signal picked up by the microphone is fulfilled;

keeping the selected channel as the receiving channel, if said predefined criterion is fulfilled; and selecting another channel from among said predefined number of possible transmission channels as the candidate of the unknown radio channel, if said predefined criterion is not fulfilled.

2. A method according to claim 1 wherein the predefined criterion concerning the degree of similarity of two signals relates to an estimate of the correlation between the two signals.

3. A method according to claim 2, wherein
a correlation measurement is performed over a predefined time.

4. A method according to claim 3, wherein the correlation measurement time and/or the number of correlation measurements performed before deciding on the current correlation is/are based on a target signal to noise ratio.

5. The method according to claim 3, wherein
the predefined time is 20 seconds or less.

6. A method according to claim 2, wherein
an estimate of a correlation between the two signals is based on parts of the signals in question.

7. A method according to claim 2 wherein an estimate of a correlation between the two signals is based on voice detection in the respective signals.

8. A method according to claim 2 wherein an estimate of a correlation between the two signals is determined in one or more particular sub-frequency ranges or bands of the total frequency range of the respective signals.

9. A method according to claim 1, further comprising:
generating an activity control signal indicative of whether the wireless receiver of each audio receiving device is receiving a signal on the currently selected channel.

10. A method according to claim 9 comprising, changing to another channel selected among said predefined number of possible transmission channels in case the activity control signal indicates that the currently selected channel is not active.

11. A method according to claim 1, further comprising:
bringing the audio receiving device into a specific mode of operation; and
performing said selecting, analyzing, and determining when the audio receiving device is brought into the specific mode of operation.

12. A data processing system comprising a processor and program code means for causing the processor to perform the steps of the method of claim 1.

13. An audio broadcasting system, comprising:
an audio transmitting device, including
a microphone for generating an electric signal in response to receiving an audio input signal, and
a wireless transmitter for transmitting on an unknown radio channel among a predefined number of possible transmission channels a wireless signal comprising a representation of said electric signal; and
a plurality of audio receiving devices, each audio receiving device including
a microphone for picking up the audio input signal or an audio signal derived from the audio input signal in the environment of the audio receiving device, and for converting the sound to an electric input signal,
a channel selection unit configured to select a channel as a candidate of the unknown radio channel in a wireless receiver of the audio listening device among said predefined number of possible transmission channels,
the wireless receiver for receiving the electric signal on the channel selected by the channel selection unit among the predefined number of possible transmission channels, and
an analyzing unit configured to analyze the electric signal received by the wireless receiver and the electric input signal output up by the microphone of the audio receiving device, and configured to determine whether a predefined criterion of a degree of similarity of the two signals is fulfilled, wherein
the channel selection unit is configured to keep the selected channel as the receiving channel, if the predefined criterion is fulfilled, and configured to select another channel from among said predefined number of possible transmission channels as the candidate of the unknown radio channel, if the predefined criterion is not fulfilled.

14. The audio broadcasting system according to claim 13, wherein each audio receiving device further comprises:
an indicator for indicating when a receiving channel has been identified.

15. The audio broadcasting system according to claim 13, wherein the microphone of each audio receiving device is specifically adapted to provide an appropriate signal for channel selection.

16. The audio broadcasting system according to claim 13, wherein each audio receiving device is adapted to be detachably attached to another device.

17. The audio broadcasting system according to claim 13, wherein each audio receiving device comprises:
a voice detector for determining whether or not the electric input signal comprises a voice signal at a given point in time.

18. The audio broadcasting system according to claim 17, wherein
a correlation measurement is only initiated, if a voice is detected in the signal picked up by the microphone.

19. The audio broadcasting system according to claim 13, wherein each audio receiving device is adapted to identify a receiving channel based on a specific test signal issued by an audio source and transmitted by a corresponding audio transmitting device on a relevant transmission channel.

20. The audio broadcasting system according to claim 13, wherein the wireless receiver of each audio receiving device comprises an activity control unit adapted to generate an activity control signal indicative of whether the wireless receiver is receiving a signal on the currently selected channel.

21. The audio broadcasting system according to claim 13, wherein each audio receiving device is a listening device.

22. The audio broadcasting system according to claim 21, wherein the listening device comprises:
a hearing instrument,
a headset,
an ear phone,
an active ear protection device, or
a combination thereof.

\* \* \* \* \*